(12) United States Patent
Wu et al.

(10) Patent No.: US 12,525,229 B2
(45) Date of Patent: *Jan. 13, 2026

(54) SMALL FOOTPRINT MULTI-CHANNEL KEYWORD SPOTTING

(71) Applicant: Google LLC, Mountain View, CA (US)

(72) Inventors: Jilong Wu, Mountain View, CA (US); Yiteng Huang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,462

(22) Filed: Jun. 26, 2024

(65) Prior Publication Data

US 2024/0347051 A1    Oct. 17, 2024

Related U.S. Application Data

(63) Continuation of application No. 17/757,260, filed as application No. PCT/US2020/013705 on Jan. 15, 2020, now Pat. No. 12,051,406.

(51) Int. Cl.
*G10L 15/16* (2006.01)
*G10L 15/08* (2006.01)
(Continued)

(52) U.S. Cl.
CPC ............ *G10L 15/16* (2013.01); *G10L 15/285* (2013.01); *H04R 3/005* (2013.01); *G10L 2015/088* (2013.01)

(58) Field of Classification Search
CPC . G10L 15/16; G10L 15/285; G10L 2015/088; H04R 3/005
(Continued)

(56) References Cited

U.S. PATENT DOCUMENTS

| 10,304,440 B1 | 5/2019 | Panchapagesan et al. |
| 2022/0130375 A1* | 4/2022 | Miller ............... H04R 3/005 |
| 2022/0167113 A1 | 5/2022 | Beckhardt |

OTHER PUBLICATIONS

Oct. 13, 2020 Written Opinion (WO) of the International Searching Authority (ISA) and International Search Report (ISR) issued in International Application No. PCT/US2020/013705.
(Continued)

*Primary Examiner* — Thjuan K Addy
(74) *Attorney, Agent, or Firm* — Honigman LLP; Brett A. Krueger

(57) ABSTRACT

A method to detect a hotword in a spoken utterance includes receiving a sequence of input frames characterizing streaming multi-channel audio. Each channel of the streaming multi-channel audio includes respective audio features captured by a separate dedicated microphone. For each input frame, the method includes processing, using a three-dimensional (3D) single value decomposition filter (SVDF) input layer of a memorized neural network, the respective audio features of each channel in parallel and generating a corresponding multi-channel audio feature representation based on a concatenation of the respective audio features. The method also includes generating, using sequentially-stacked SVDF layers, a probability score indicating a presence of a hotword in the audio. The method also includes determining whether the probability score satisfies a threshold and, when satisfied, initiating a wake-up process on a user device.

20 Claims, 11 Drawing Sheets

(51) Int. Cl.
*G10L 15/28* (2013.01)
*H04R 3/00* (2006.01)

(58) Field of Classification Search
USPC .................................... 381/26, 300, 303, 1
See application file for complete search history.

(56) References Cited

OTHER PUBLICATIONS

Alvarez Raziel et al: "End-to-end Streaming Keyword Spotting", ICASSP 2019—2019 IEEE International Conference on Acoustics, Speech and Signal Processing (ICASSP), IEEE, May 12, 2019 (May 12, 2019), pp. 6336-6340, XP033566108.
Yundong Zhang et al: "Hello Edge: Keyword Spotting on Microcontrollers", arxiv.org, Cornell University Library, 201 OLIN Library Cornell University Ithaca, NY 14853, Nov. 20, 2017 (Nov. 20, 2017), XP081319805.
Lin Shaohui et al: "Holistic CNN Compression via Low-Rank Decomposition with Knowledge Transfer", IEEE Transactions on Pattern Analysis and Machine Intelligence, IEEE Computer Society, USA, vol. 41, No. 12, Dec. 1, 2019 (Dec. 1, 2019), pp. 2889-2905, XP011756708, ISSN: 0162-8828, DOI: 10.1109/TPAMI.2018.2873305.
Osawa Kazuki et al: "Evaluating the Compression Efficiency of the Filters in Convolutional Neural Networks", Oct. 25, 2017 (Oct. 25, 2017), Big Data Analytics in the Social and Ubiquitous Context: 5th International Workshop on Modeling Social Media, MSM 2014, 5th International Workshop on Mining Ubiquitous and Social Environments, Muse 2014 And First International Workshop on Machine Le, XP047451748, ISBN: 978-3-642-17318-9.
Examination Report for related Indian Application No. 202227033173 dated Oct. 11, 2022.

\* cited by examiner

SMALL FOOTPRINT MULTI-CHANNEL KEYWORD SPOTTING

CROSS REFERENCE TO RELATED APPLICATIONS

This U.S. Patent Application is a continuation of, and claims priority under 35 U.S.C. § 120 from, U.S. patent application Ser. No. 17/757,260, filed on Jun. 13, 2022, which is a U.S. national phase application under 35 U.S.C. § 371 of PCT application PCT/US2020/013705. The disclosures of these prior art applications are considered part of the disclosure of this application and are hereby incorporated by reference in their entireties.

TECHNICAL FIELD

This disclosure relates to small footprint multi-channel keyword spotting in streaming audio.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. These devices may include two or more microphones to record multi-channel audio. Neural networks have recently emerged as an attractive solution for training models to detect hotwords spoken by users in streaming audio. Typically, neural networks used to detect hotwords in streaming audio receive a single channel of streaming audio.

SUMMARY

One aspect of the disclosure provides a method for training a memorized neural network and using the trained memorized neural network to detect a hotword in a spoken utterance. The method includes receiving, at data processing hardware of a user device, a sequence of input frames characterizing streaming multi-channel audio captured by an array of microphones in communication with the data processing hardware. Each channel of the streaming multi-channel audio includes respective audio features captured by a separate dedicated microphone in the array of microphones. For each input frame, the method includes processing, by the data processing hardware, using a three-dimensional (3D) single value decomposition filter (SVDF) input layer of a memorized neural network, the respective audio features of each channel of the streaming multi-channel audio in parallel and generating, by the data processing hardware, using an intermediate layer of the memorized neural network, a corresponding multi-channel audio feature representation based on a concatenation of the respective audio features of each channel of the streaming multi-channel audio. The method also includes generating, by the data processing hardware, using sequentially-stacked SVDF layers of the memorized neural network, a probability score indicating a presence of a hotword in the streaming multi-channel audio based on the corresponding multi-channel audio feature representation of each input frame. The method also includes determining, by the data processing hardware, whether the probability score satisfies a hotword detection threshold. When the probability score satisfies the hotword detection threshold, the method includes initiating, by the data processing hardware, a wake-up process on the user device for processing the hotword and/or one or more other terms following the hotword in the streaming multi-channel audio.

Implementations of the disclosure may include one or more of the following optional features. In some implementations, the 3D SVDF input layer includes multiple parallel SVDF processing cells. Each SVDF processing cell of the multiple parallel SVDF processing cells is associated with a respective channel of the streaming multi-channel audio and configured to perform the processing on the respective audio features of the respective channel. In some examples, each SVDF processing cell includes at least one neuron, and each neuron includes a respective memory component, a first stage configured to perform filtering on the respective audio features of the respective channel of each input frame individually and output the filtered features to the respective memory component, and a second stage configured to perform filtering on all the filtered audio features residing in the respective memory component. The respective memory component is associated with a respective memory capacity of the corresponding neuron.

Optionally, the respective audio features of each respective channel of each input frame includes log-filterbanks. Each input frame may include forty log-filterbanks. The sequentially-stacked SVDF layers of the memorized neural network, in some examples, include an initial SVDF layer configured to receive the corresponding multi-channel audio feature representation of each input frame in sequence.

In some implementations, each sequentially-stacked SVDF layer includes at least one neuron, and each neuron includes a respective memory component, a first stage configured to perform filtering on the corresponding multi-channel audio feature representation of each input frame individually and output the filtered multi-channel audio feature representation to the respective memory component, and a second stage configured to perform filtering on all the filtered multi-channel audio feature representations residing in the respective memory component. The respective memory component is associated with a respective memory capacity of the corresponding neuron.

A sum of the memory capacities associated with the respective memory components for a neuron from each of the sequentially-stacked SVDF layers may provide the memorized neural network with a fixed memory capacity proportional to a length of time a typical speaker takes to speak the hotword. The respective memory capacity associated with at least one of the respective memory components may be different than the respective memory capacities associated with the remaining memory components. In some examples, the respective memory capacities associated with the respective memory components of all the sequentially-stacked SVDF layers is the same.

In some implementations, a remote system trains the memorized neural network on a plurality of multi-channel training input audio sequences. Each channel of each multi-channel training input audio sequence includes a sequence of respective input frames that each include one or more respective audio features characterizing phonetic components of the hotword and labels assigned to the respective input frames. Each label indicates a probability that the audio features of a respective input frame include a phonetic component of the hotword. In some examples, each channel of each corresponding multi-channel training input audio sequence among a first portion of the plurality of multi-channel training input audio sequences is a duplicate with each other channel of the corresponding multi-channel training input audio sequence and each channel of each corresponding multi-channel training input audio sequence among a remaining second portion of the plurality of multi-channel training input audio sequences is unique to each other channel of the corresponding multi-channel training input audio sequence. Optionally, the 3D SVDF input layer includes multiple parallel SVDF processing cells. Each SVDF processing cell of the multiple parallel SVDF processing cells is associated with a respective channel of each multi-channel training input audio sequence and configured to receive the respective audio features of each respective input frame of the respective channel individually.

Another aspect of the disclosure provides a system for training a memorized neural network and using the trained memorized neural network to detect a hotword in a spoken utterance. The system includes data processing hardware of a user device and memory hardware in communication with the data processing hardware. The memory hardware stores instructions that when executed on the data processing hardware cause the data processing hardware to perform operations. The operations include receiving a sequence of input frames characterizing streaming multi-channel audio captured by an array of microphones in communication with the data processing hardware. Each channel of the streaming multi-channel audio includes respective audio features captured by a separate dedicated microphone in the array of microphones. For each input frame, the operations include processing, using a three-dimensional (3D) single value decomposition filter (SVDF) input layer of a memorized neural network, the respective audio features of each channel of the streaming multi-channel audio in parallel and generating, using an intermediate layer of the memorized neural network, a corresponding multi-channel audio feature representation based on a concatenation of the respective audio features of each channel of the streaming multi-channel audio. The operations also include generating, using sequentially-stacked SVDF layers of the memorized neural network, a probability score indicating a presence of a hotword in the streaming multi-channel audio based on the corresponding multi-channel audio feature representation of each input frame. The operations also include determining whether the probability score satisfies a hotword detection threshold. When the probability score satisfies the hotword detection threshold, the operations include initiating a wake-up process on the user device for processing the hotword and/or one or more other terms following the hotword in the streaming multi-channel audio.

This aspect may include one or more of the following optional features. In some implementations, the 3D SVDF input layer includes multiple parallel SVDF processing cells. Each SVDF processing cell of the multiple parallel SVDF processing cells is associated with a respective channel of the streaming multi-channel audio and configured to perform the processing on the respective audio features of the respective channel. In some examples, each SVDF processing cell includes at least one neuron, and each neuron includes a respective memory component, a first stage configured to perform filtering on the respective audio features of the respective channel of each input frame individually and output the filtered features to the respective memory component, and a second stage configured to perform filtering on all the filtered audio features residing in the respective memory component. The respective memory component is associated with a respective memory capacity of the corresponding neuron.

Optionally, the respective audio features of each respective channel of each input frame includes log-filterbanks. Each input frame may include forty log-filterbanks. The sequentially-stacked SVDF layers of the memorized neural network, in some examples, include an initial SVDF layer configured to receive the corresponding multi-channel audio feature representation of each input frame in sequence.

In some implementations, each sequentially-stacked SVDF layer includes at least one neuron, and each neuron includes a respective memory component, a first stage configured to perform filtering on the corresponding multi-channel audio feature representation of each input frame individually and output the filtered multi-channel audio feature representation to the respective memory component, and a second stage configured to perform filtering on all the filtered multi-channel audio feature representations residing in the respective memory component. The respective memory component is associated with a respective memory capacity of the corresponding neuron.

A sum of the memory capacities associated with the respective memory components for a neuron from each of the sequentially-stacked SVDF layers may provide the memorized neural network with a fixed memory capacity proportional to a length of time a typical speaker takes to speak the hotword. The respective memory capacity associated with at least one of the respective memory components may be different than the respective memory capacities associated with the remaining memory components. In some examples, the respective memory capacities associated with the respective memory components of all the sequentially-stacked SVDF layers is the same.

In some implementations, a remote system trains the memorized neural network on a plurality of multi-channel training input audio sequences. Each channel of each multi-channel training input audio sequence includes a sequence of respective input frames that each include one or more respective audio features characterizing phonetic components of the hotword and labels assigned to the respective input frames. Each label indicates a probability that the audio features of a respective input frame include a phonetic component of the hotword. In some examples, each channel of each corresponding multi-channel training input audio sequence among a first portion of the plurality of multi-channel training input audio sequences is a duplicate with each other channel of the corresponding multi-channel training input audio sequence and each channel of each corresponding multi-channel training input audio sequence among a remaining second portion of the plurality of multi-channel training input audio sequences is unique to each other channel of the corresponding multi-channel training input audio sequence. Optionally, the 3D SVDF input layer includes multiple parallel SVDF processing cells. Each SVDF processing cell of the multiple parallel SVDF processing cells is associated with a respective channel of each multi-channel training input audio sequence and configured to receive the respective audio features of each respective input frame of the respective channel individually.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
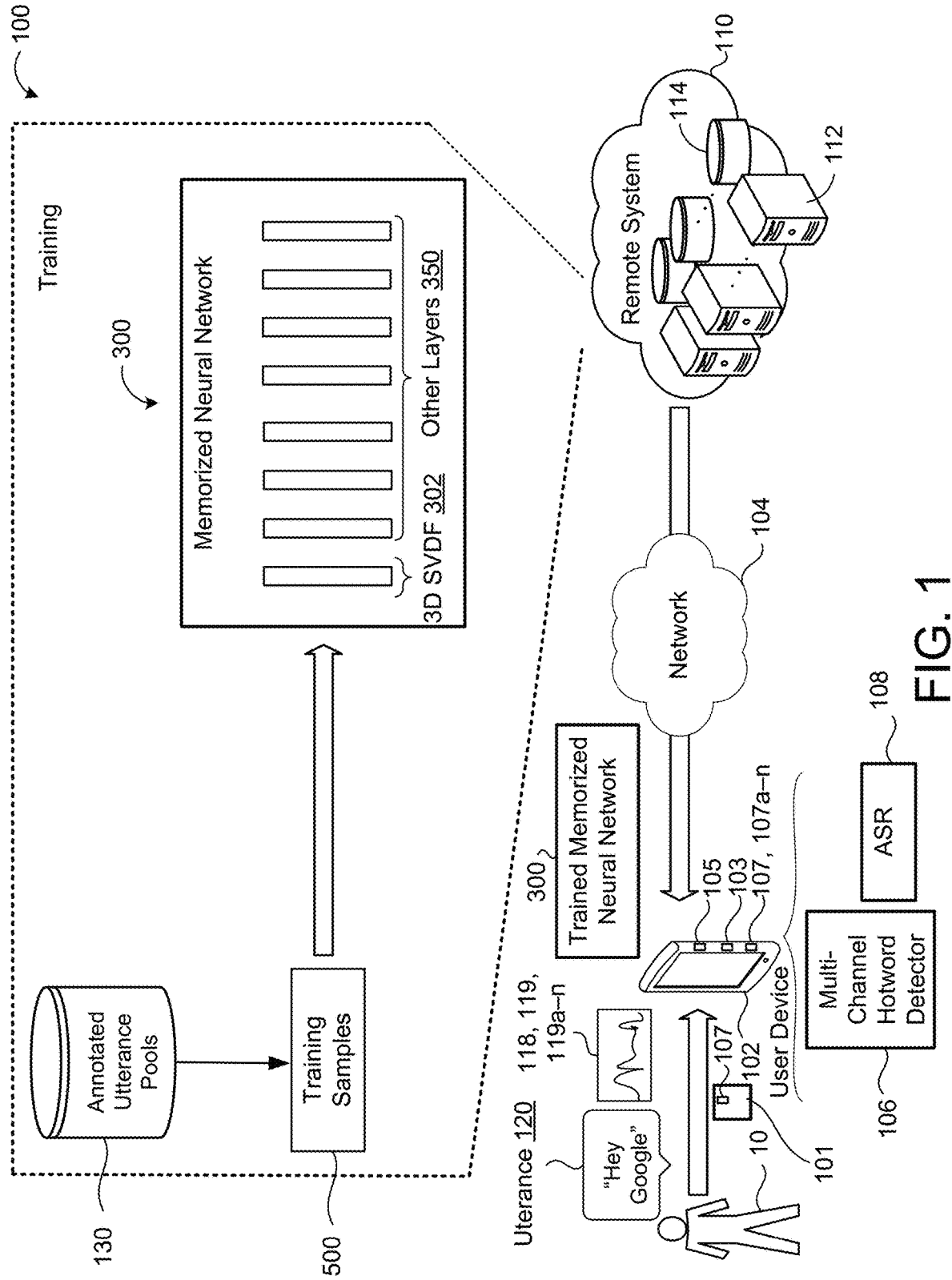
FIG. 1 is a schematic view of an example system for training a memorized neural network and using the trained memorized neural network to detect a hotword in a spoken utterance.

A voice-enabled device (e.g., a user device executing a voice assistant) allows a user to speak a query or a command out loud and field and answer the query and/or perform a function based on the command. Through the use of a "hotword" (also referred to as a "keyword", "attention word", "wake-up phrase/word", "trigger phrase", or "voice action initiation command"), in which by agreement a predetermined term/phrase that is spoken to invoke attention for the voice enabled device is reserved, the voice enabled device is able to discern between utterances directed to the system (i.e., to initiate a wake-up process for processing one or more terms following the hotword in the utterance) and utterances directed to an individual in the environment. Typically, the voice-enabled device operates in a sleep state to conserve battery power and does not process input audio data unless the input audio data follows a spoken hotword. For instance, while in the sleep state, the voice-enabled device captures input audio via a microphone and uses a hotword detector trained to detect the presence of the hotword in the input audio. When the hotword is detected in the input audio, the voice-enabled device initiates a wake-up process for processing the hotword and/or any other terms in the input audio following the hotword.

Hotword detection is analogous to searching for a needle in a haystack because the hotword detector must continuously listen to streaming audio, and trigger correctly and instantly when the presence of the hotword is detected in the streaming audio. In other words, the hotword detector is tasked with ignoring streaming audio unless the presence of the hotword is detected. Neural networks are commonly employed by hotword detectors to address the complexity of detecting the presence of a hotword in a continuous stream of audio.

A hotword detector typically receives a single channel of audio recorded by a single microphone (i.e., mono audio) and determines presence of the hotword within the single channel of audio. Some user devices may include two or more microphones to record multi-channel streaming audio (i.e., one channel per microphone). In this case, the hotword detector typically will include a neural network for each channel, with each neural network processing a separate channel of audio to determine a presence of the hotword within the respective channel. The output of each neural network (i.e., the determination of the presence of the hotword within the respective channel) may be combined via logical OR. That is, if any of the neural networks determine presence of the hotword in their respective channel of streaming audio, the wake-up process for the user device is initiated. This technique drastically increases the computing resources (e.g., processing speed and memory consumption) necessary for the hotword detector. For example, a hotword detector that uses two models to process two channels of audio captured by two independent microphones may double the computing resources required over a single model processing a single channel of audio. Moreover, because each model processes only a single channel of audio, the hotword detector fails to take advantage potential benefits from using a microphone array to enhance noise robustness.

Implementations herein are directed toward an end-to-end multi-channel hotword spotting system (also referred to as a 'keyword spotting system') that trains a single memorized neural network to determine a probability of a presence of a designated hotword in multi-channel streaming audio. This single memorized neural network may be trained to detect multiple hotwords, as well as detecting a same hotword spoken in different languages and/or different locals. Specifically, the memorized neural network refers to a neural network topology having an amount of fixed memory proportional to an amount of multi-channel streaming audio the neural network wants to remember into the past. For instance, it may be desirable for the neural network to have only enough memory to remember an amount of multi-channel streaming audio equivalent to the time a typical speaker takes to speak a designated hotword. In some implementations, the memorized neural network topology is a layered topology of that includes one or more three dimensional (3D) Single Value Decomposition Filter (SVDF) layers, with each layer including two or more parallel SVDF processing cells. Each SVDF processing cell processes a separate channel of the multi-channel streaming audio simultaneously and in parallel with the other SVDF processing cells.

Each SVDF processing cell is configured to perform processing on respective audio features of the respective channel and includes at least one neuron having a respective memory capacity. Each neuron may also include an appropriate activation function (e.g., rectified linear). Additionally, the output of each SVDF processing cell is concatenated together and passed to a subsequent intermediate layer to generate a multi-channel audio feature representation of the streaming multi-channel audio.

Referring to FIG. 1, in some implementations, an example system 100 includes one or more user devices 102 each associated with a respective user 10 and in communication with a remote system 110 via a network 104. Each user device 102 may correspond to a computing device, such as a mobile phone, computer, wearable device, smart appliance, audio infotainment system, smart speaker, etc., and is equipped with data processing hardware 103 and memory hardware 105. The remote system 110 may be a single computer, multiple computers, or a distributed system (e.g., a cloud environment) having scalable/elastic computing resources 112 (e.g., data processing hardware) and/or storage resources 114 (e.g., memory hardware). The user device 102 receives a trained memorized neural network 300 from the remote system 110 via the network 104 and executes the trained memorized neural network 300 to detect hotwords in multi-channel streaming audio 118. The multi-channel streaming audio 118 includes two or more channels 119, 119a-n of audio. The trained memorized neural network 300 may reside in a multi-channel hotword detector 106 (also referred to as a hotworder) of the user device 102 that is configured to detect the presence of a hotword in streaming multi-channel audio without performing semantic analysis or speech recognition processing on the streaming multi-channel audio 118. Optionally, the trained memorized neural network 300 may additionally or alternatively reside in an automatic speech recognizer (ASR) 108 of the user device 102 and/or the remote system 110 to confirm that the multi-channel hotword detector 106 correctly detected the presence of a hotword in the multi-channel streaming audio 118.

In some implementations, the data processing hardware 112 trains the memorized neural network 300 using training samples 500 obtained from annotated utterance pools 130. The annotated utterance pools 130 may reside on the memory hardware 114 and/or some other remote memory location(s). In the example shown, when the user 10 speaks an utterance 120 including a hotword (e.g., "Hey Google") captured as multi-channel streaming audio 118 by the user device 102, the memorized neural network 300 executing on the user device 102 is configured to detect the presence of the hotword in the utterance 120 to initiate a wake-up process on the user device 102 for processing the hotword and/or one or more other terms (e.g., query or command) following the hotword in the utterance 120. In additional implementations, the user device 102 sends the utterance 120 to the remote system 110 for additional processing or verification (e.g., with another, potentially more computationally-intensive memorized neural network 300).

The user device may include (or be in communication with) two or more microphones 107, 107a-n to capture the utterance 120 from the user 10. Each microphone 107 may separately record the utterance 120 on a separate dedicated channel 119 of the multi-channel streaming audio 118. For example, the user device 102 may include two microphones 107 that each record the utterance 120, and the recordings from the two microphones 107 may be combined into two-channel streaming audio 118 (i.e., stereophonic audio or stereo). In some examples, the user device 102 may include more than two microphones. That is, the two microphones reside on the user device 102. Additionally or alternatively, the user device 102 may be in communication with two or more microphones separate/remote from the user device 102. For example, the user device 102 may be a mobile device disposed within a vehicle and in wired or wireless communication (e.g., Bluetooth) with two or more microphones of the vehicle. In some configurations, the user device 102 is in communication with least one microphone 107 residing on a separate device 101, which may include, without limitation, an in-vehicle audio system, a computing device, a speaker, or another user device. In these configurations, the user device 102 may also be in communication with one or more microphones residing on the user device 102.

In the example shown, the memorized neural network 300 includes an input three dimensional (3D) single value decomposition filter (SVDF) layer 302 and a plurality of other layers 350, e.g., sequentially-stacked SVDF layers 350. The input 3D SVDF layer 302 processes audio features of each channel 119 of the streaming multi-channel audio 118 in parallel. That is, each channel 119 of the multi-channel streaming audio 118 is provided as input 3D SVDF layer 302 to process simultaneously.

Figure 2A:
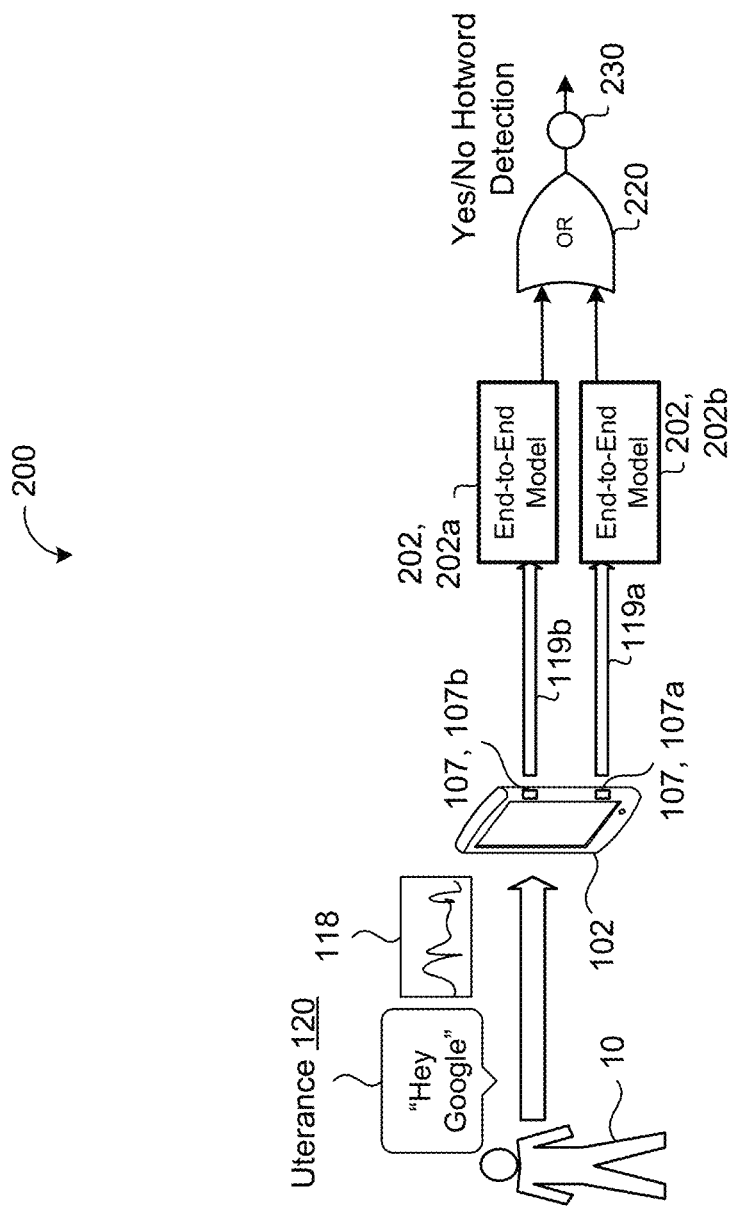
FIG. 2A is a schematic view of a typical hotword detection system that has an independent model for each channel of a multi-channel audio stream.

Referring now to FIG. 2A, a typical hotword detection systems 200 may utilize multi-channel streaming audio 118 (i.e., audio captured by microphones 107a, 107b) by implementing a separate and independent end-to-end hotword detection model 202, 202a-b for each channel 119. Each model 202 receives a single channel 119a-b of streaming audio 118 and determines presence of a hotword within the respective channel 119. The hotword determination for each model 202 is provided to a logical OR gate 220 to generate the hotword detection 230 (e.g., yes/no hotword detection or a probability score). That is, when any of the models 202 determine that the hotword is present within its respective channel 119 of streaming audio 118, the system 200 initiates the wake up procedure of the user device 102. With the system 200, not only does each model 202 consume significant computing resources, none of the models 202 gain any potential benefit (e.g., noise robustness) present in a microphone array.

Figure 2B:
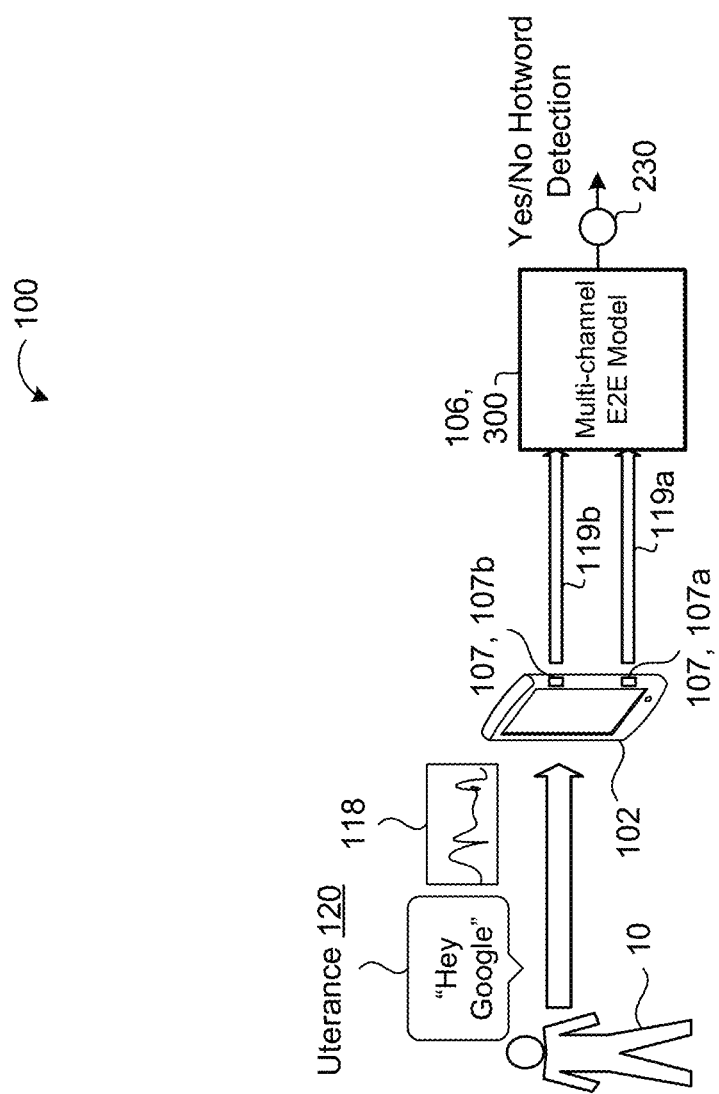
FIG. 2B is a schematic view of the example system of FIG. 1 including a single memorized neural network for all channels of a multi-channel audio stream.

In contrast to the typical system 200 of FIG. 2A that implements independent models 202 for detecting the hotword on each channel 119 of multi-channel streaming audio 118, FIG. 2B shows the multi-channel hotword detector 106 of the system 100 of FIG. 1 that uses a multi-channel end-to-end model (e.g., the memorized neural network 300) configured to simultaneously receive both channels from the multi-channel streaming audio 118. Here, not only are the computing resources approximately halved relative to the system 200 (i.e., one end-to-end model instead of two), the multi-channel model 300 may take advantage of the accuracy and noise robustness increases present when processing multi-channel streaming audio 118. For example, the multi-channel model 300 may not only take advantage of redundancy in frequency features from each channel, but also exploit temporal variations across channels to enhance noise robustness. While the example shown depicts the multi-channel streaming audio 118 having only two channels and the end-to-end model 300 receiving each of the two channels 119a, 119b simultaneously, the model 300 can similarly receive three or more channels 119 simultaneously when the multi-channel streaming audio 118 includes three or more channels. Moreover, the model 300 may also be configured to receive only a single channel 119 when the streaming audio 118 includes only a single channel.

Figure 3:
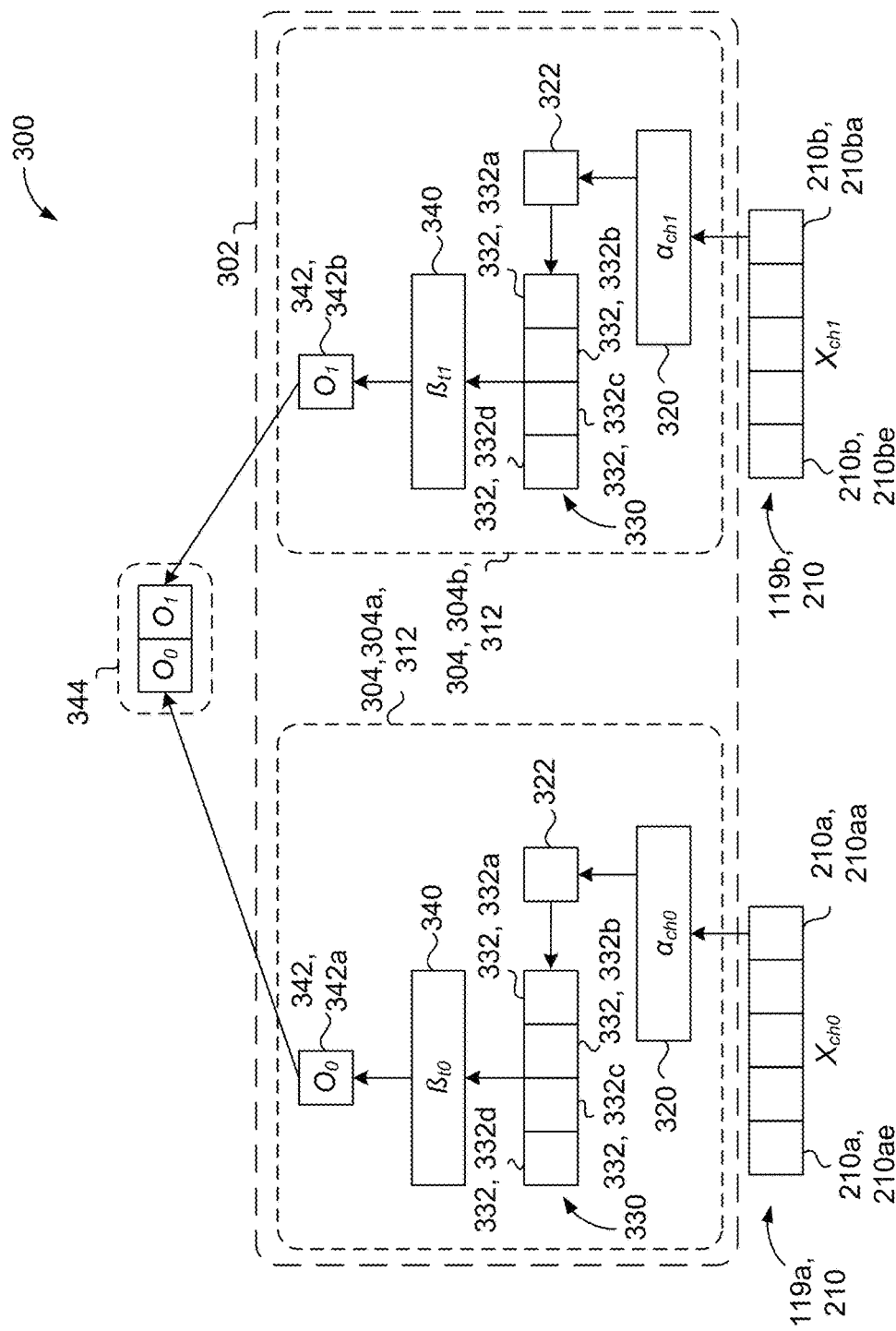
FIG. 3 is a schematic view of example components of the memorized neural network of the system of FIG. 1.

Referring now to FIG. 3, in some implementations, the 3D SVDF neural network 300 (also referred to as a memorized neural network) includes at least one 3D SVDF layer 302. Each 3D SVDF layer 302 includes two or more SVDF processing cells 304, 304a-b and each SVDF processing cell 304 receives a sequence of input frames 210, 210aa-be that characterize the streaming multi-channel audio 118 captured by the microphones 107. Each SVDF processing cell 304 receives a separate channel of input frames 210a, 210b. In the example shown, the SVDF processing cell 304a receives input frames 210a that include audio features from a first channel 119a (i.e., channel 0) captured by a first microphone 107a, while the SVDF processing cell 304b receives input frames 210b that include audio features from a second channel 119b (i.e., channel 1) captured by a second microphone 107b. That is, the 3D SVDF input layer 302 may include multiple parallel SVDF processing cells 304, and each SVDF processing cell 304 of the multiple parallel SVDF processing cells is associated with a respective channel 119 of the streaming multi-channel audio 118 and configured to perform processing on respective audio features 510 (FIG. 5) of the respective channel 119.

Each SVDF processing cell 304 has any number of neurons/nodes 312, where each neuron 312 accepts only a single frame 210 of a spoken utterance 120 at a time. That is, if each frame 210, for example, constitutes 30 ms of audio data, a respective frame 210 is input to the neuron 312 approximately every 30 ms. Each neuron 312 may include a two-stage filtering mechanism: a first stage 320 (i.e., $\alpha_{ch0}$ and $\alpha_{ch1}$) that performs filtering on a features dimension of the input and a second stage 340 (i.e., $\beta_{t0}$ and $\beta_{t1}$) that performs filtering on a time dimension on the outputs of the first stage 320. Therefore, the stage 1 feature filter 320 performs feature filtering on only the current frame 210. A result 322 of the processing is then placed in a memory component 330. The size of the memory component 330 is configurable per node or per layer level. The respective memory capacity associated with at least one of the respective memory components 330 may be different than the respective memory capacities associated with the remaining memory components 330. Alternatively, the respective memory capacities associated with the respective memory components 330 of the neurons 312 of all the SVDF processing cells 304 is the same.

After the stage 1 feature filter 320 processes a given frame 210 (e.g., by filtering audio features of the respective channel within the frame 210), the filtered result 322 is placed in a next available memory location 332, 332a-d of the memory component 330. Once all memory locations 332 are filled, the stage 1 feature filter 320 will overwrite the memory location 332 storing the oldest filtered data in the memory component 330. Note that, for illustrative purposes, FIG. 3 shows a memory component 330 of size four (four memory locations 332a-d) and five frames 210aa-e, 210ba-be, but due to the nature of hotword detection, the system 100 will typically monitor multi-channel streaming audio 118 continuously such that each neuron 312 will "slide" along or process frames 210 akin to a pipeline. Put another way, if each stage includes N feature filters 320 and N time filters 340 (each matching the size of the input feature frame 210), the layer is analogous to computing N×T (T equaling the number of frames 210 in a fixed period of time) convolutions of the feature filters by sliding each of the N filters 320, 340 on the input feature frames 210, with a stride the size of the feature frames. For example, after the memory component 330 is at capacity after the stage 1 feature filter outputs the filtered audio features 322 into memory location 332d, the stage 1 feature filter 320 would place filtered audio features 322 associated with following frame (i.e., 210ae, 210be) into memory 330 by overwriting the filtered audio features 322 associated with frame 210aa, 210ba within memory location 332a. In this way, the stage 2 time filter 340 applies filtering to the previous T−1 (T again equaling the number of frames 210 in a fixed period of time) filtered audio features output from the stage 1 feature filter 320.

The stage 2 time filter 340 then filters each filtered audio feature stored in memory 330. For example, FIG. 3 shows the stage 2 time filter 340 filtering the audio features in each of the four memory locations 332 every time the stage 1 feature filter 320 stores a new filtered audio feature into memory 330. In this way, the stage 2 time filter 340 is always filtering a number of past frames 210, where the number is proportional to the size of the memory 330. Each neuron 312 is part of a single SVDF processing cell 304, and the neural network 300 may include any number of processing cells 304.

Figure 4:
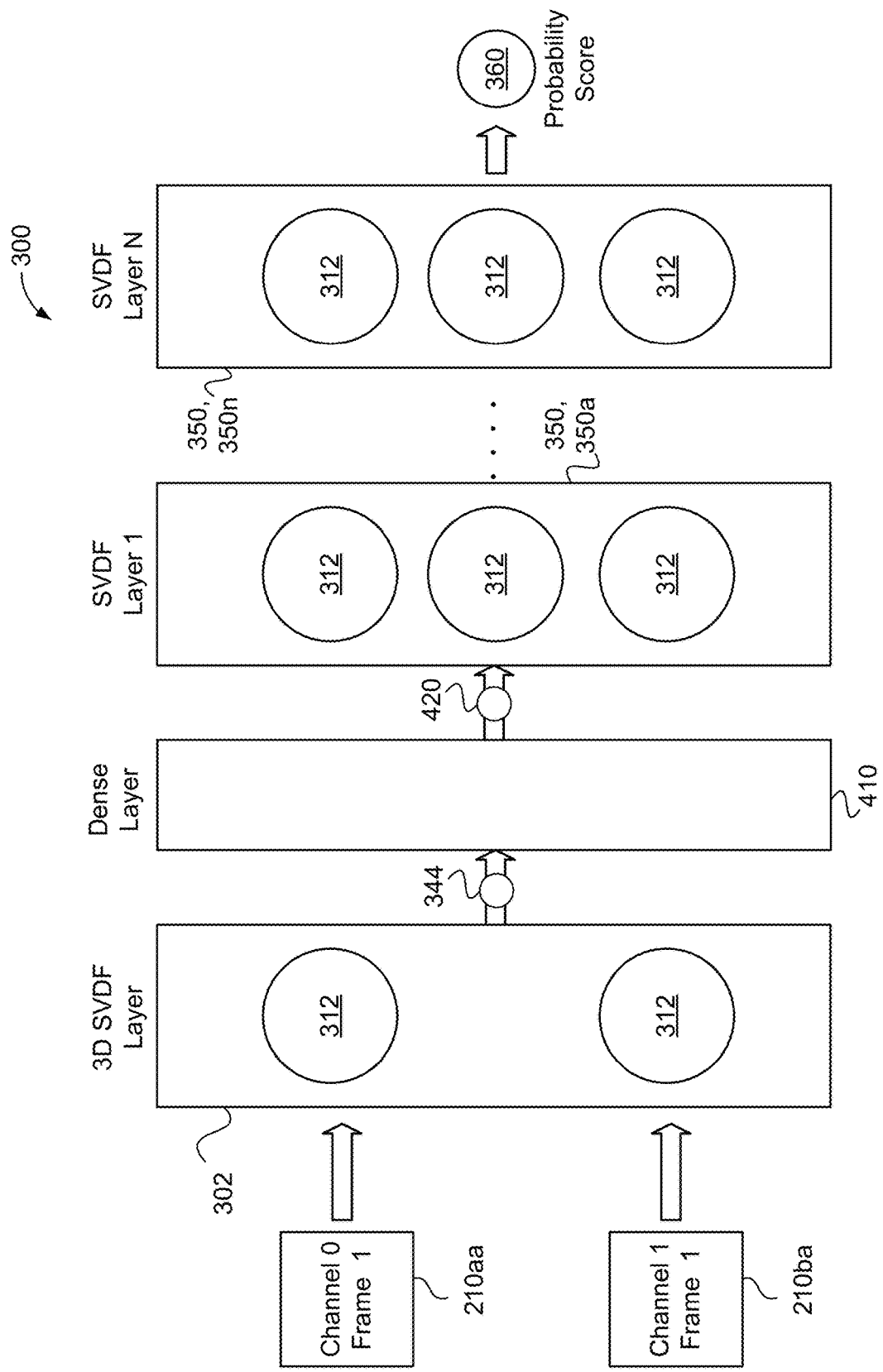
FIG. 4 is a schematic view of example components of a memorized neural network with multiple layers.

An output 342, 342a-b of each stage 2 time filter 340 within a 3D SVDF layer 302 may be concatenated together to form a single output 344. In the example shown, the output 342a of the SVDF processing cell 304a (i.e., (O$_0$) is concatenated with the output 342b of the SVDF processing cell 304b (i.e., (O$_1$) to form the single output 344. The concatenated output 344 is passed as an input to a subsequent layer of the memorized neural network 300. In some examples, the next layer may be another 3D SVDF layer 302 and the concatenated output 344 is passed to a neuron 312 of the next 3D SVDF layer 302. In other examples, the subsequent layer is a fully-connected dense layer (FIG. 4). The number of layers and the number of neurons 312 per layer is fully configurable and is dependent upon available resources and desired size, power, and accuracy. This disclosure is not limited to the number of 3D SVDF layers 302 (or other layer types), the number of SVDF processing cells 304 per 3D SVDF layer 302, nor the number of neurons 312 in each SVDF processing cell 304.

Referring now to FIG. 4, the input 3D SVDF layer 302 of the neural network 300 is connected such that the output 344 is accepted as an input to a subsequent layer. In some implementations, the subsequent intermediate layer is a dense layer 410. The dense layer 410 may generate a corresponding multi-channel audio feature representation 420 based on the concatenated output 344 received from the 3D SVDF layer(s) 302. The dense layer is a fully-connected layer (i.e., every input is connected to every output) that processes the concatenated output 344. In some examples, the dense layer 410 compensates for phase differences between the channels 119 of the multi-channel streaming audio 118. That is, based on a difference in distance between the user 10 and each microphone 107, each channel 119 has a different phase. Because the SVDF processing cells 304 include time filtering (i.e., the stage 2 time filter 340), the dense layer 410 may process the concatenated output 344 to compensate or adjust for this phase delay similar to techniques used in beamforming.

In some implementations, subsequent layers include one or more additional 3D SVDF layers 302. Subsequent layers include one or more SVDF layers 350 (e.g., sequentially-stacked SVDF layers 350). The sequentially-stacked SVDF layers 350 may generate a probability score 360 indicating a presence of a hotword in the streaming multi-channel audio 118 based on the corresponding multi-channel audio feature representation 420 of each input frame 210. The sequentially-stacked SVDF layers 350 include an initial SVDF layer 350a configured to receive the corresponding multi-channel audio feature representation 420. Each SVDF layer 350 includes substantially the same components as each SVDF processing cell 304 of the 3D SVDF layer 302. That is, each SVDF layer 350 and each SVDF processing cell 304 of the 3D SVDF layer 302 include at least one neuron 312 that includes the respective memory component 330, stage 1 feature filter 320, and stage 2 time filter 340. The sequentially-stacked SVDF layers 350 may be referred to as two-dimensional (2D) SVDF layers, and similarly, as each SVDF processing cell 304 is associated with a respective channel of the multi-channel streaming audio 118, each SVDF processing cell 304 also corresponds to a 2D SVDF layer that processes the respective audio features of the channel in parallel with the other SVDF processing cells 304 for each input frame 210 of the streaming multi-channel audio 118. The parallel SVDF processing cells 304 of the 3D SVDF layer 302 add a third dimension (i.e., channels) to the two dimensions of the SVDF layers 350 (i.e., frequency and time). In some examples, the final layer 350n of the memorized neural network 300 outputs a probability score 360 indicating the probability that the utterance 120 includes the hotword. The system 100 may determine that the utterance 120 includes the hotword when the probability score satisfies a hotword detection threshold and initiate a wake-up process on the user device 102.

Thus, implementations herein are directed toward a stateful, stackable neural network 300 that detects a hotword within a multi-channel stream of audio using three dimensions (i.e., time, frequency, and channel). A 3D SVDF layer 302 includes multiple SVDF processing cells 304 parallel. Each neuron 312 of each SVDF processing cell 304 includes a first stage 320, associated with filtering audio features, and a second stage 340, associated with filtering outputs of the first stage 320 with respect to time. Specifically, the first stage 320 is configured to perform filtering on one or more audio features on one audio feature input frame 210 at a time and output the filtered audio features to the respective memory component 330. Here, the stage 1 feature filter 320 receives one or more audio features associated with a time frame 210 as input for processing and outputs the processed audio features into the respective memory component 330 of the SVDF processing cell 304. Thereafter, the second stage 340 is configured to perform filtering on all the filtered audio features output from the first stage 320 and residing in the respective memory component 330. For instance, when the respective memory component 330 is equal to eight (8), the second stage 340 would pull up to the last eight (8) filtered audio features residing in the memory component 330 that were output from the first stage 320 during individual filtering of the audio features within a sequence of eight (8) input frames 210. As the first stage 320 fills the corresponding memory component 330 to capacity, the memory locations 332 containing the oldest filtered audio features are overwritten (i.e., first in, first out). Thus, depending on the capacity of the memory component 330 at the neuron 312 or processing cell 304, the second stage 340 is capable of remembering a number of past outputs processed by the first stage 320 of the corresponding SVDF processing cell 304. Moreover, since the memory components 330 at the SVDF processing cells 304 are additive, the memory component 330 at each neuron 312 also includes the memory of each preceding neuron 312, thus extending the overall receptive field of the memorized neural network 300. As a result, the 3D SVDF layer(s) 302 and the sequentially-stacked SVDF layers 350 allow the neural network 300 to process only the audio features for one input time frame 210 (e.g., 30 milliseconds of audio data) at a time and incorporate a number of filtered audio features into the past that capture the fixed length of time necessary to capture the designated hotword in the multi-channel streaming audio 118. By contrast, a neural network without memory would require its neurons 212 to process all of the audio feature frames covering the fixed length of time (e.g., 2 seconds of audio data) at once in order to determine the probability of the multi-channel streaming audio including the presence of the hotword, which drastically increases the overall size of the network. Moreover, while recurrent neural networks (RNNs) using long short-term memory (LSTM) provide memory, RNN-LSTMs cause the neurons to continuously update their state after each processing instance, in effect having an infinite memory, and thereby prevent the ability to remember a finite past number of processed outputs where each new output re-writes over a previous output (once the fixed-sized memory is at capacity). Put another way, SVDF networks do not recur the outputs into the state (memory), nor rewrite all the state with each iteration; instead, the memory keeps each inference run's state isolated from subsequent runs, instead pushing and popping in new entries based on the memory size configured for the layer.

Figure 5A:
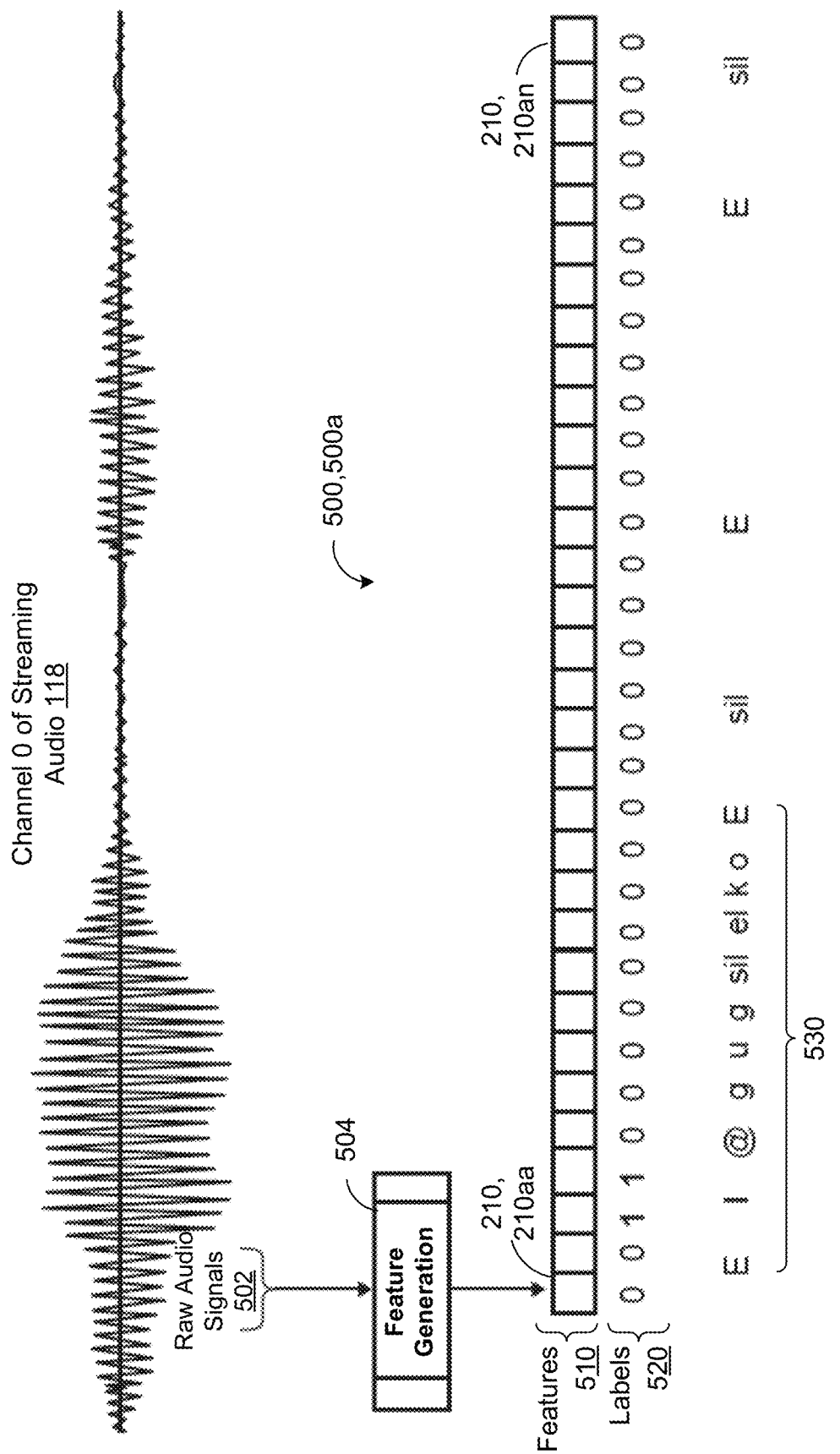
FIGS. 5A and 5B are schematic views showing audio feature-label pairs generated from streaming audio for training neural networks.
Figure 5B:
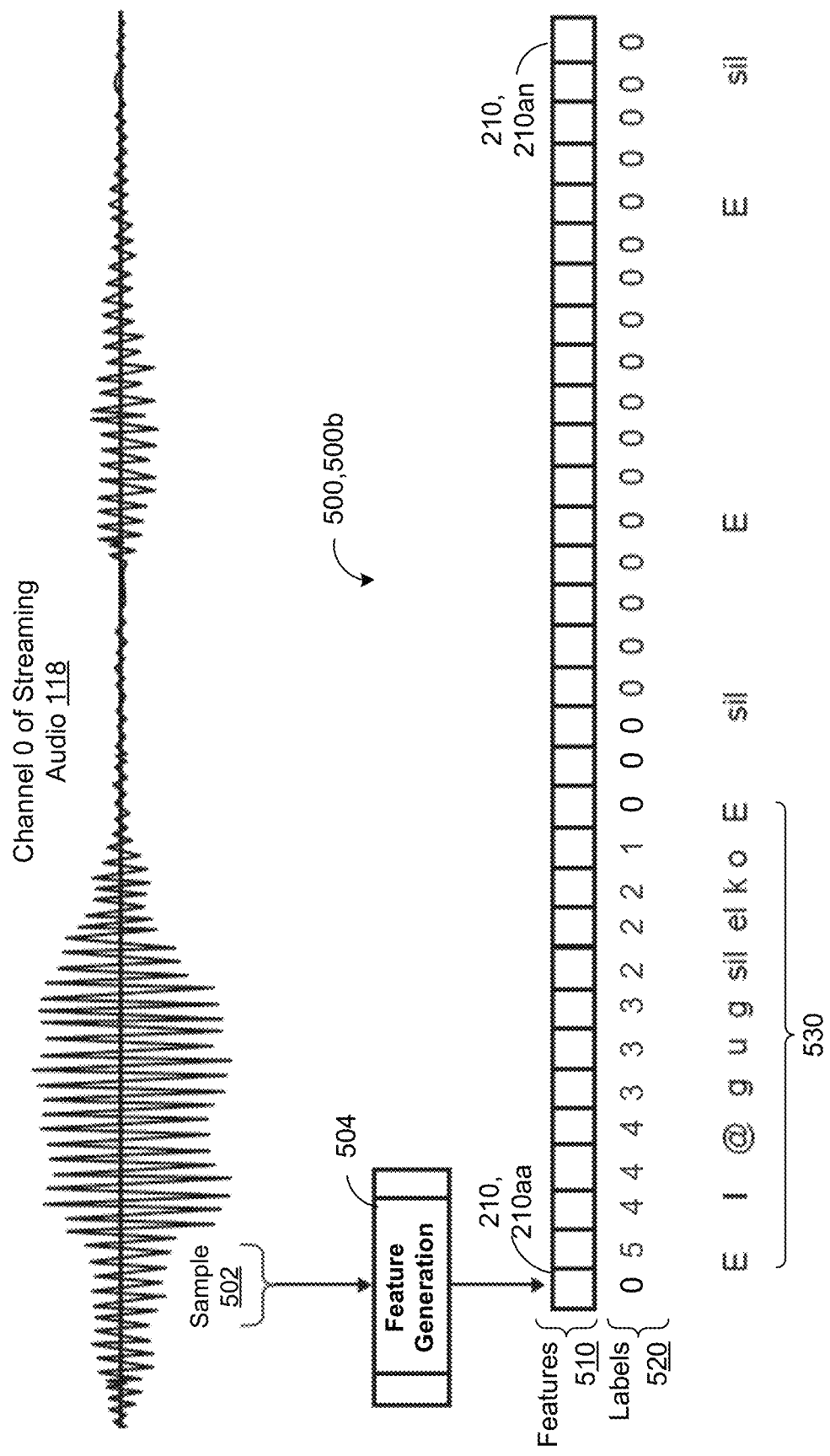

Referring now to FIGS. 5A and 5B, in some implementations, the memorized neural network 300 is trained on a plurality of training input audio sequences 500 (i.e., training samples) that each include a sequence of input frames 210 and labels 520 assigned to the input frames 210 for each channel 119 of the multi-channel streaming audio 118. Each input frame 210 includes one or more respective audio features 510 characterizing phonetic components 530 of a hotword, and each label 520 indicates a probability that the one or more audio features 510 of a respective input frame 210 include a phonetic component 530 of the hotword. In the example shown, channel 0 of streaming audio 118 is provided, but it is understood that all other channels 119 of the multi-channel streaming audio 118 include similar training input audio sequences and components (e.g., respective audio feature 420 characterizing phonetic components 530 and labels 520 indicating a probability that the one or more audio features 510 includes a phonetic component 530 of the hotword). In some examples, the audio features 510 for each input frame 210 are converted from raw audio signals 502 of a channel 119 of the multi-channel audio stream 118 during a pre-processing stage 504 (i.e., a feature extraction or feature generation stage). The audio features 510 may include one or more log-filterbanks. Thus, the pre-processing stage may segment the audio stream channel 119 into the sequence of input frames 210 (e.g., 30 ms each), and generate separate log-filterbanks for each frame 210. For example, each frame 210 may be represented by forty log-filterbanks. Each SVDF processing cell 304 of the input 3D SVDF layer 302 receives the sequence of input frames 210 from a respective channel 119. Moreover, each successive layer (e.g., SVDF layers 350) receives, as input, the concatenated filtered audio features 510 (i.e., output 344) with respect to time. In some examples, the 3D SVDF input layer 302 includes multiple parallel SVDF processing cells 304 and each SVDF processing cell 304 is associated with a respective channel of each multi-channel training input audio sequence 510 and configured to receive the respective audio features 510 of each respective input frame 210 of the respective channel individually.

In the example shown (i.e., channel 0 of the multi-channel streaming audio 118), each training input audio sequence 500 is associated with a training sample that includes an annotated utterance containing a designated hotword occurring within a fixed length of time (e.g., two seconds). The memorized neural network 300 may be trained on such a training input audio sequence 500 for each SVDF processing cell 304 of the input 3D SVDF layer 302. For example, two SVDF processing cells 304 (i.e., for two channels 119 of multi-channel streaming audio 118), the memorized neural network 300 may receive two training input audio sequences 500. The memorized neural network 300 may also optionally be trained on annotated utterances 500 that do not include the designated hotword, or include the designated hotword but spanning a time longer than the fixed length of time, and thus, would not be falsely detected due to the fixed memory forgetting data outside the fixed length of time. In some examples, the fixed length of time corresponds to an amount of time that a typical speaker would take to speak the designated hotword to summon a user device 102 for processing spoken queries and/or voice commands. For instance, if the designated hotword includes the phrase "Hey Google" or "Ok Google", a fixed length of time set equal to two seconds is likely sufficient since even a slow speaker would generally not take more than two seconds to speak the designated phrase. Accordingly, since it is only important to detect the occurrence of the designated hotword within streaming audio 118 during the fixed length of time, the neural network 300 includes an amount of fixed memory that is proportional to the amount of audio to span the fixed time (e.g., two seconds). Thus, the fixed memory of the neural network 300 allows neurons 312 of the neural network to filter audio features 510 (e.g., log-filterbanks) from one input frame 210 (e.g., 30 ms time window) for each channel 119 of the streaming audio 118 at a time, while storing the most recent filtered audio features 510 spanning the fixed length of time and removing or deleting any filtered audio features 510 outside the fixed length of time from a current filtering iteration. Thus, if the neural network 300 has, for example, a memory depth of thirty-two (32), the first thirty-two (32) frames processed by the neural network 300 will fill the memory component 330 to capacity, and for each new output after the first 32, the neural network 300 will remove the oldest processed audio feature from the corresponding memory location 332 of the memory component 330.

Referring to FIG. 5A, for end-to-end training, training input audio sequence 500a includes labels 520 that may be applied to each input frame 210. In some examples, when a training sample 500a contains the hotword, a target label 520 associated with a target score (e.g., '1') is applied to one or more input frames 210 that contain audio features 510 characterizing phonetic components 530 at or near the end of the hotword. For example, if the phonetic components 530 of the hotword "OK Google" are broken into: "ou", 'k', "el", "<silence>", 'g', 'u', 'g', '@', 'l', then target labels of the number '1' are applied to all input frames 210 that correspond to the letter 'l' (i.e. the last component 530 of the hotword), which are part of the required sequence of phonetic components 530 of the hotword. In this scenario, all other input frames 210 (not associated with the last phonetic component 530) are assigned a different label (e.g., '0'). Thus, each input frame 210 includes a corresponding input feature-label pair 510, 520. The input features 510 are typically one-dimensional tensors corresponding to, for example, mel filterbanks or log-filterbanks, computed from the input audio over the input frame 210. The labels 520 are generated from the annotated utterances 500a, where each input feature tensor 510 is assigned a phonetic class via a force-alignment step (i.e., a label of '1' is given to pairs corresponding to the last class belonging to the hotword, and '0' to all the rest). Thus, the training input audio sequence 500a includes binary labels assigned to the sequence of input frames. The annotated utterances 500a, or training input audio sequence 500a, correspond to the training samples 500 obtained from the annotated utterance pools 130 of FIG. 1.

In another implementation, FIG. 5B includes a training input audio sequence 500b that includes labels 520 associated with scores that increase along the sequence of input frames 210 as the number of audio features 510 characterizing (matching) phonetic components 530 of the hotword progresses. For instance, when the hotword includes "Ok Google", the input frames 210 that include respective audio features 510 that characterize the first phonetic components, 'o' and 'k', have assigned labels 520 of '1', while the input frames 210 that include respective audio features 510 characterizing the final phonetic component of 'l' have assigned labels 520 of '5'. The input frames 210 including respective audio features 510 characterizing the middle phonetic components 530 have assigned labels 520 of '2', '3', and '4'.

In additional implementations, the number of positive labels 520 increases. For example, a fixed amount of '1' labels 520 is generated, starting from the first frame 210 including audio features 510 characterizing to the final phonetic component 530 of the hotword. In this implementation, when the configured number of positive labels 520 (e.g., '1') is large, a positive label 520 may be applied to frames 210 that otherwise would have been applied a non-positive label 520 (e.g., '0'). In other examples, the start position of the positive label 520 is modified. For example, the label 520 may be shifted to start at either a start, mid-point, or end of a segment of frames 210 containing the final keyword phonetic component 530. Still yet in other examples, a weight loss is associated with the input sequence. For example, weight loss data is added to the input sequence that allows the training procedure to reduce the loss (i.e. error gradient) caused by small mis-alignment. Specifically, with frame-based loss functions, a loss can be caused from either mis-classification or mis-alignment. To reduce the loss, the neural network 300 predicts both the correct label 520 and correct position (timing) of the label 520. Even if the network 300 detected the keyword at some point, the result can be considered an error if it's not perfectly aligned with the given target label 520. Thus, weighing the loss is particularly useful for frames 210 with high likelihood of mis-alignment during the force-alignment stage.

Figure 6:
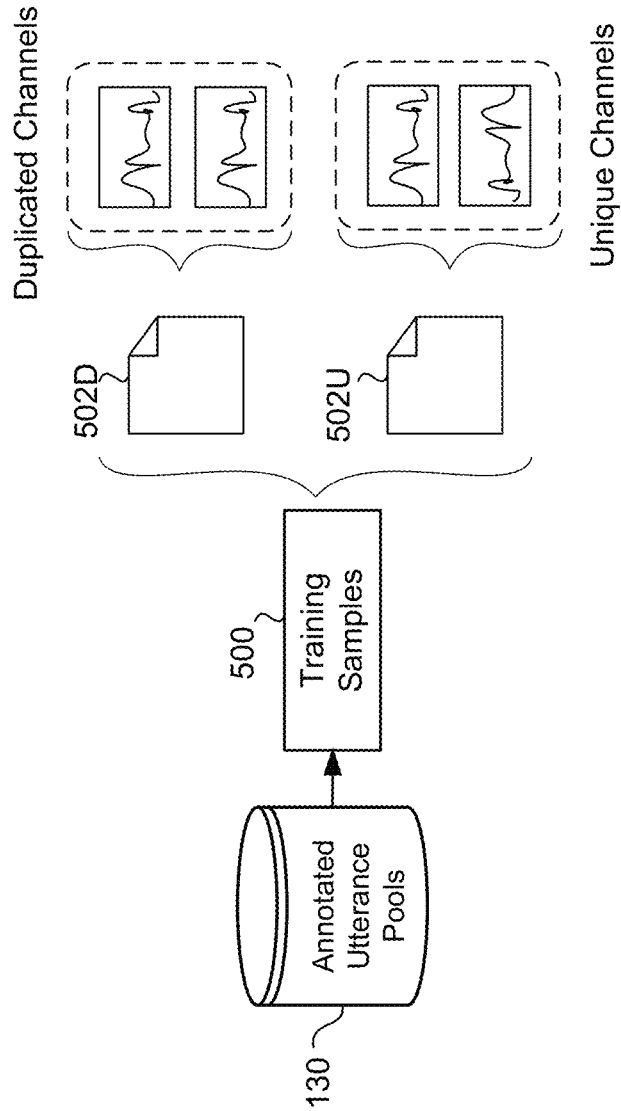
FIG. 6 is a schematic view of training samples including duplicated channels and unique channels.

As a result of training using either of the training input audio sequences 500a, 500b of FIGS. 5A and 5B, the neural network 300 is optimized (typically using cross-entropy (CE) loss) to output binary decision labels 520 indicating whether the hotword(s) are present in the streaming audio 118. Referring now to FIG. 6, each training sample 500 (i.e., each multi-channel training input audio sequence) includes a channel of training input audio sequence 500 for each SVDF processing cell 304 of the input 3D SVDF layer 302. In some implementations, the training samples 500 include a first portion of training samples 502D (i.e., training input audio sequences) where each channel is a duplicate with each other channel of the multi-channel training input audio sequence. For example, a training sample 502D that includes two channels includes an identical training sequence for each channel. Each channel in a remaining second portion of training samples 502U may be unique to each other channel of the multi-channel training input audio sequence. For example, a training sample 502U that includes two channels would include a different training sequence for each channel (e.g., captured by two separate microphones).

Including a mix of training samples 500 that include both duplicated channels 502D and unique channels 502U ensures that the memorized neural network 300 is trained to accurately respond when the network 300 receives valid audio data from multiple channels 119 (i.e., multiple microphones 107) and also when the network receives only a single valid channel 119 of audio. For example, a user device 102 may include only a single microphone 107 or one or more microphones 107 of a multi-microphone user device 102 may fail. In either case, it is desirable for the memorized neural network to still accurately detect the presence of the hotword in utterances 120. By training the memorize neural network 300 on a portion of training samples 502D that provide only a single channel of unique audio (as each channel is a duplicate of each other channel), the memorized neural network 300 learns to accurately detect the presence of a hotword when provided with only a single channel of valid audio.

Figure 7:
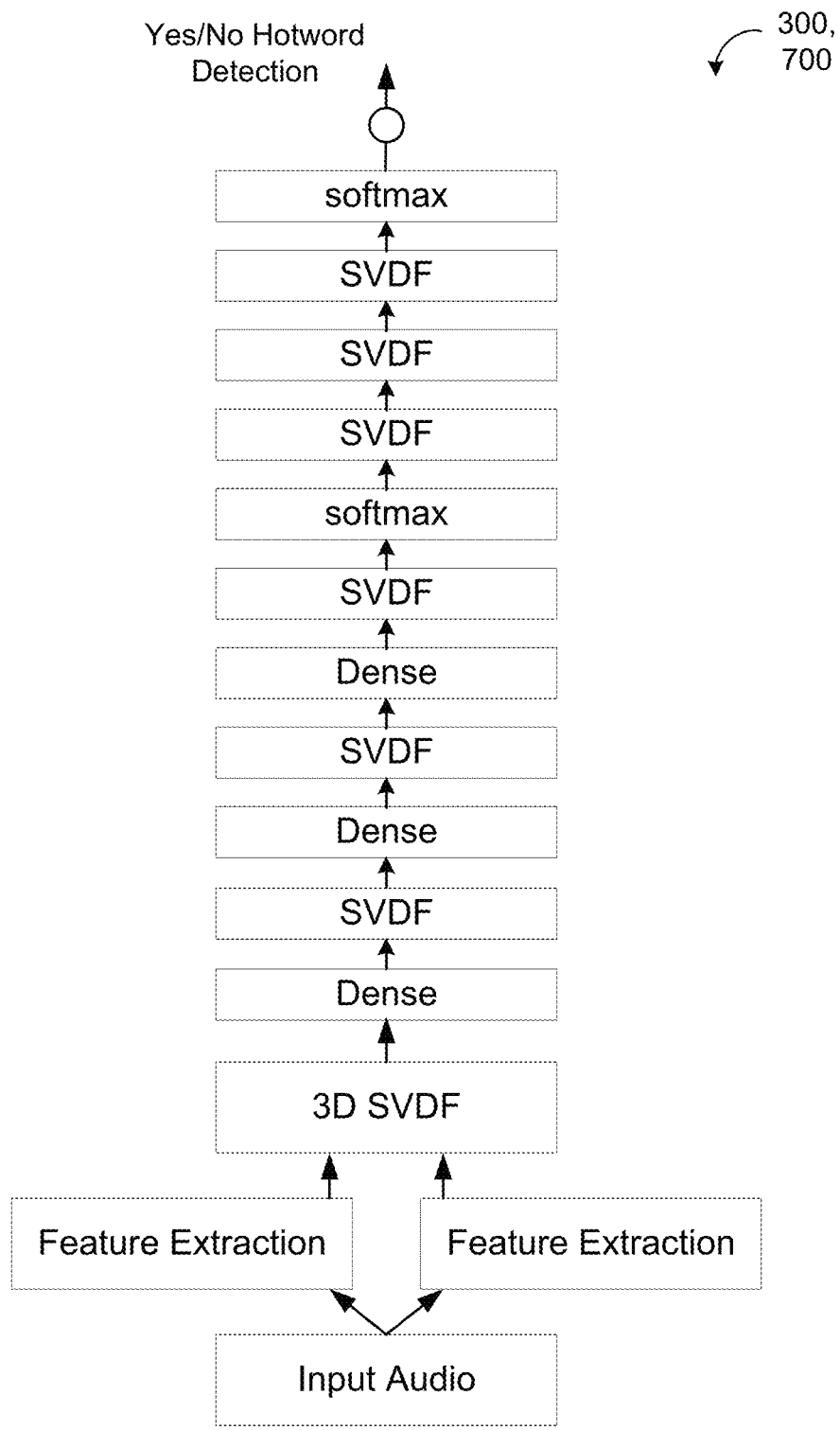
FIG. 7 is a schematic view of layers of the memorized neural network of the system of FIG. 1.

Referring now to FIG. 7, schematic view 700 shows the neural network 300 that includes, for example, twelve layers, that are trained to produce acoustic posterior probabilities. In addition to the 3D SVDF layers 302, the network 300 may, for example, include SVDF layers, dense layers, bottleneck layers, softmax layers, and/or other layers. The neural network 300 may be trained end-to-end. For example, the neural network 300 accepts features directly and uses the binary target label 520 (i.e., '0' or '1') outputs for use in training the network 300. Such an end-to-end neural network 300 may use any topology. In some examples, the network 300 includes an encoder portion and a decoder portion.

Thus, the neural network 300 provides a small footprint while increasing accuracy and noise robustness using multiple channels of streaming audio captured by multiple independent microphones. The hotword detection system 100 requires only a single memorized neural network 300 for any number of audio channels 119, thus significantly reducing required computing resources. The memorized neural network 300 is trained using a mix of duplicated and unique audio channels so that the network accurately detects the presence of a hotword when receiving both a single channel of audio and multiple channels of audio.

Figure 8:
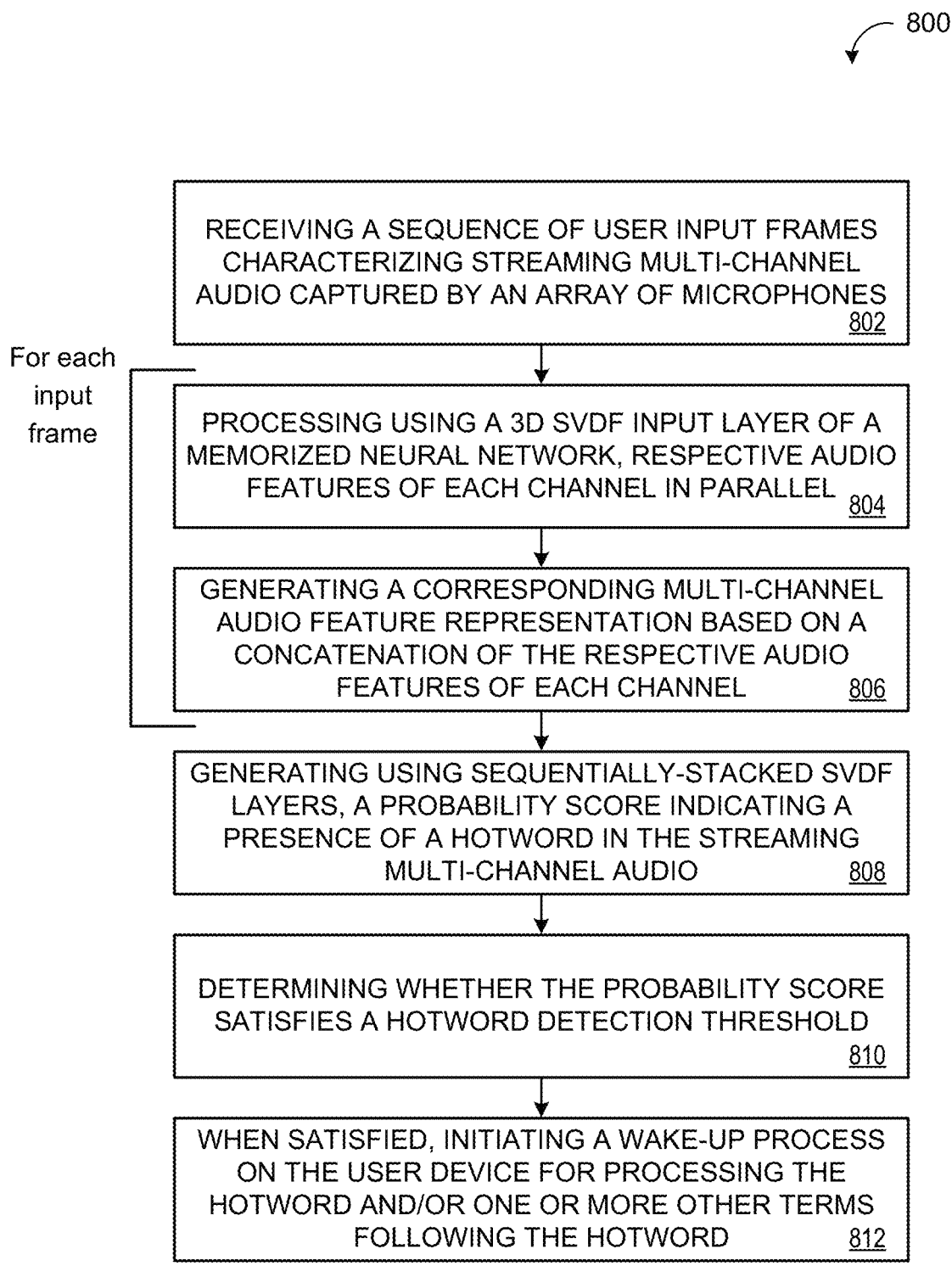
FIG. 8 is a flowchart of an example arrangement of operations for a method of detecting a hotword in multi-channel streaming audio.

FIG. 8 is a flowchart of an example arrangement of operations for a method 800 of detecting a hotword in multi-channel streaming audio 118. The method 800, at step 802, includes receiving, at data processing hardware 103 of a user device 102, a sequence of input frames 210 characterizing streaming multi-channel audio 118 captured by an array of microphones 107 in communication with the data processing hardware 103. Each channel of the streaming multi-channel audio 18 includes respective audio features 510 captured by a separate dedicated microphone 107 in the array of microphones. For each input frame, the method 800, at step 804, includes processing, by the data processing hardware 103, using a three-dimensional (3D) single value decomposition filter (SVDF) input layer 302 of a memorized neural network 300, the respective audio features 510 of each channel 119 of the streaming multi-channel audio 118 in parallel. Also for each input frame, the method 800, at step 806, includes generating, by the data processing hardware 103, using an intermediate layer 410 of the memorized neural network 300, a corresponding multi-channel audio feature representation 420 based on a concatenation of the respective audio features 344 of each channel 119 of the streaming multi-channel audio 118.

At step 808, the method 800 also includes generating, by the data processing hardware 103, using sequentially-stacked SVDF layers 350 of the memorized neural network 300, a probability score 360 that indicates a presence of a hotword in the streaming multi-channel audio 118 based on the corresponding multi-channel audio feature representation 420 of each input frame 210. The sequentially-stacked SVDF layers 350 include an initial SVDF layer 350 configured to receive the corresponding multi-channel audio feature representation 420 of each input frame 210 in sequence. At step 810, the method 800 includes determining, by the data processing hardware 103, whether the probability score 360 satisfies a hotword detection threshold, and at step 812, when the probability score 360 satisfies the hotword detection threshold, initiating, by the data processing hardware 103, a wake-up process on the user device 102 for processing the hotword and/or one or more other terms following the hotword in the streaming multi-channel audio 118.

Figure 9:
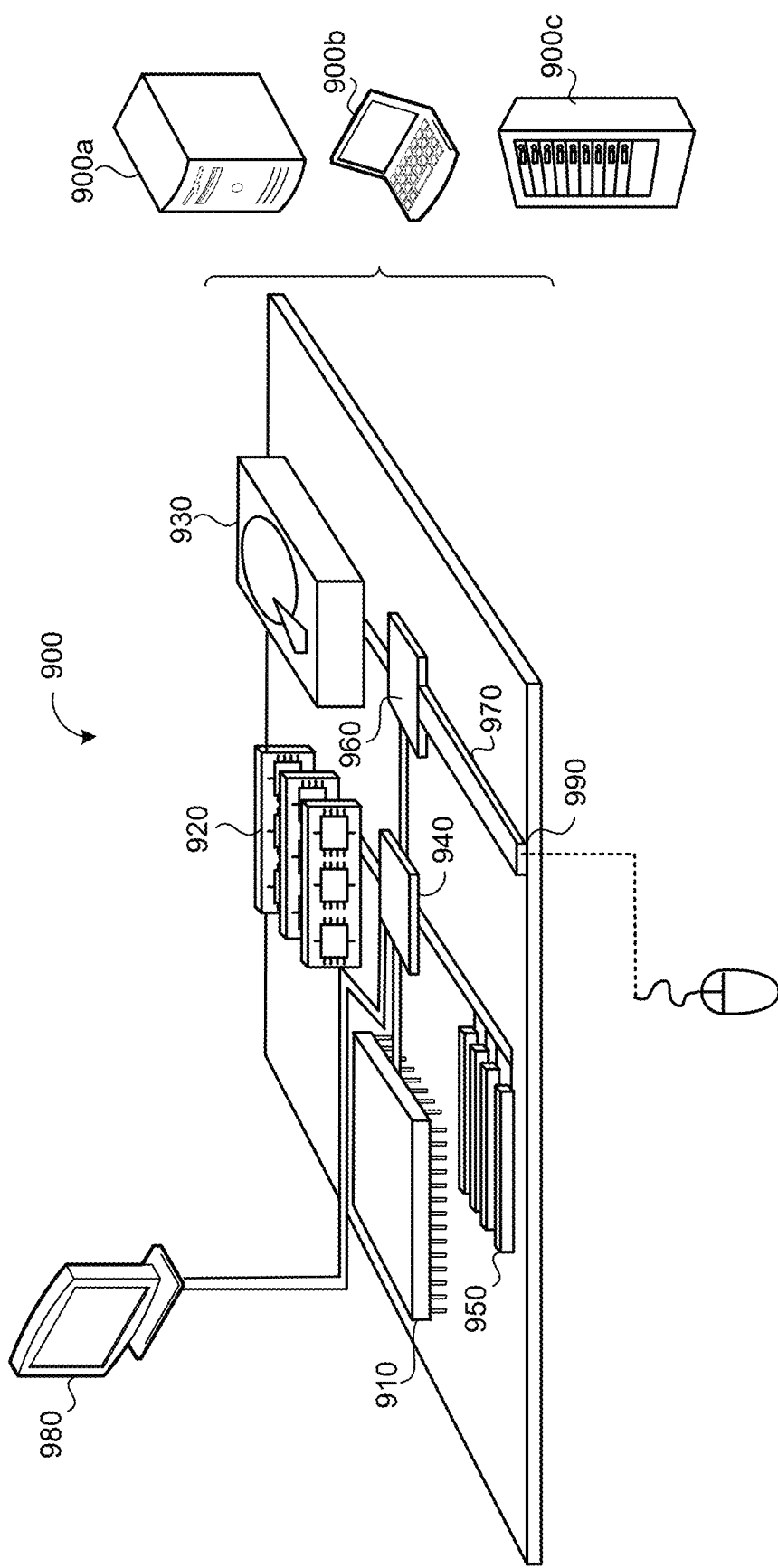
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes data processing hardware to perform operations comprising:
   receiving a plurality of multi-channel training input audio sequences, each channel of each multi-channel training input audio sequence captured by a separate dedicated microphone in an array of microphones and comprising:
      a sequence of respective input frames that each include one or more respective audio features characterizing phonetic components of a hotword; and
      labels assigned to the respective input frames, each label indicating a probability that the audio features of a respective input frame include a phonetic component of the hotword;
   for each input frame of each sequence of respective input frames:

processing the respective audio features of each channel of the multi-channel training input audio sequence in parallel; and generating a corresponding multi-channel audio feature representation based on a concatenation of the respective audio features of each channel of the channel training input audio; and for each multi-channel training input audio sequence:

generating a probability score indicating a presence of the hotword in the multi-channel training input audio sequence based on the corresponding multi-channel audio feature representation generated for each input frame;

determining a cross entropy loss based on the probability score and the labels assigned to the respective input frames; and training a memorized neural network based on the cross entropy loss.

2. The computer-implemented method of claim 1, wherein processing the respective audio features of each channel of the multi-channel training input audio sequence comprises processing the respective audio features using a three-dimensional (3D) single value decomposition filter (SVDF) input layer of the memorized neural network.

3. The computer-implemented method of claim 2, wherein the 3D SVDF input layer comprises multiple parallel SVDF processing cells each associated with a respective channel of the plurality of multi-channel training input audio sequence and configured to perform the processing on the respective audio features of the respective channel.

4. The computer-implemented method of claim 3, wherein each SVDF processing cell comprises at least one neuron, each neuron comprising:

a respective memory component associated with a respective memory capacity of the corresponding neuron;

a first stage configured to perform filtering on the respective audio features of the respective channel of each input frame individually and output the filtered features to the respective memory component; and a second stage configured to perform filtering on all the filtered audio features residing in the respective memory component.

5. The computer-implemented method of claim 3, wherein the respective audio features of each respective channel of each input frame comprise log-filterbanks.

6. The computer-implemented method of claim 5, wherein each input frame comprises forty log-filterbanks.

7. The computer-implemented method of claim 1, wherein generating the corresponding multi-channel audio feature representation comprises generating the corresponding multi-channel audio feature representation using sequentially-stacked single value decomposition filter (SVDF) layers of the memorized neural network.

8. The computer-implemented method of claim 7, wherein the sequentially-stacked SVDF layers of the memorized neural network comprise an initial SVDF layer configured to receive the corresponding multi-channel audio feature representation of each input frame.

9. The computer-implemented method of claim 7, wherein each sequentially-stacked SVDF layer comprises at least one neuron, each neuron comprising:

a respective memory component associated with a respective memory capacity of the corresponding neuron;

a first stage configured to perform filtering on the corresponding multi-channel audio feature representation of each input frame individually and output the filtered multi-channel audio feature representation to the respective memory component; and a second stage configured to perform filtering on all the filtered multi-channel audio feature representations residing in the respective memory component.

10. The computer-implemented method of claim 9, wherein a sum of the memory capacities associated with the respective memory components for a neuron from each of the sequentially-stacked SVDF layers provide the memorized neural network with a fixed memory capacity proportional to a length of time a typical speaker takes to speak the hotword.

11. A system comprising:

data processing hardware; and memory hardware in communication with the data processing hardware, the memory hardware storing instructions that when executed on the data processing hardware cause the data processing hardware to perform operations comprising:

receiving a plurality of multi-channel training input audio sequences, each channel of each multi-channel training input audio sequence captured by a separate dedicated microphone in an array of microphones and comprising:

a sequence of respective input frames that each include one or more respective audio features characterizing phonetic components of a hotword; and labels assigned to the respective input frames, each label indicating a probability that the audio features of a respective input frame include a phonetic component of the hotword;

for each input frame of each sequence of respective input frames:

processing the respective audio features of each channel of the multi-channel training input audio sequence in parallel; and generating a corresponding multi-channel audio feature representation based on a concatenation of the respective audio features of each channel of the channel training input audio; and for each multi-channel training input audio sequence:

generating a probability score indicating a presence of the hotword in the multi-channel training input audio sequence based on the corresponding multi-channel audio feature representation generated for each input frame;

determining a cross entropy loss based on the probability score and the labels assigned to the respective input frames; and training a memorized neural network based on the cross entropy loss.

12. The system of claim 11, wherein processing the respective audio features of each channel of the multi-channel training input audio sequence comprises processing the respective audio features using a three-dimensional (3D) single value decomposition filter (SVDF) input layer of the memorized neural network.

13. The system of claim 12, wherein the 3D SVDF input layer comprises multiple parallel SVDF processing cells each associated with a respective channel of the plurality of multi-channel training input audio sequence and configured to perform the processing on the respective audio features of the respective channel.

14. The system of claim 13, wherein each SVDF processing cell comprises at least one neuron, each neuron comprising:

a respective memory component associated with a respective memory capacity of the corresponding neuron;
a first stage configured to perform filtering on the respective audio features of the respective channel of each input frame individually and output the filtered features to the respective memory component; and
a second stage configured to perform filtering on all the filtered audio features residing in the respective memory component.

15. The system of claim 13, wherein the respective audio features of each respective channel of each input frame comprise log-filterbanks.

16. The system of claim 15, wherein each input frame comprises forty log-filterbanks.

17. The system of claim 11, wherein generating the corresponding multi-channel audio feature representation comprises generating the corresponding multi-channel audio feature representation using sequentially-stacked single value decomposition filter (SVDF) layers of the memorized neural network.

18. The system of claim 17, wherein the sequentially-stacked SVDF layers of the memorized neural network comprise an initial SVDF layer configured to receive the corresponding multi-channel audio feature representation of each input frame.

19. The system of claim 17, wherein each sequentially-stacked SVDF layer comprises at least one neuron, each neuron comprising:
a respective memory component associated with a respective memory capacity of the corresponding neuron;
a first stage configured to perform filtering on the corresponding multi-channel audio feature representation of each input frame individually and output the filtered multi-channel audio feature representation to the respective memory component; and
a second stage configured to perform filtering on all the filtered multi-channel audio feature representations residing in the respective memory component.

20. The system of claim 19, wherein a sum of the memory capacities associated with the respective memory components for a neuron from each of the sequentially-stacked SVDF layers provide the memorized neural network with a fixed memory capacity proportional to a length of time a typical speaker takes to speak the hotword.

* * * * *